UNITED STATES PATENT OFFICE.

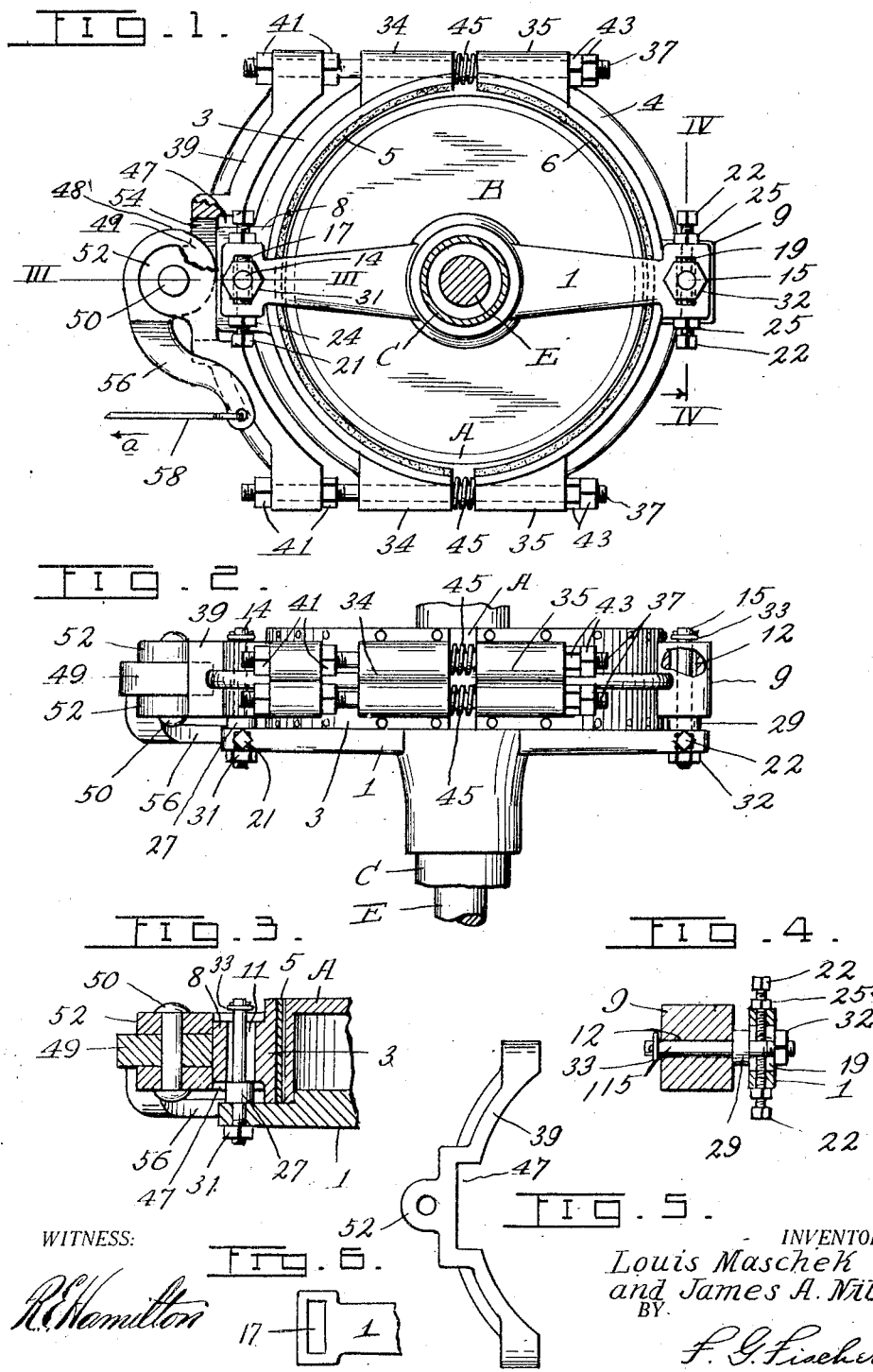

LOUIS MASCHEK AND JAMES A. NIBLO, OF KANSAS CITY, MISSOURI.

BRAKE MECHANISM.

1,383,325.                Specification of Letters Patent.        Patented July 5, 1921.

Application filed April 1, 1919. Serial No. 286,656.

*To all whom it may concern:*

Be it known that we, LOUIS MASCHEK, a citizen of the United States, residing at Kansas City, in the county of Jackson and State of Missouri, and JAMES A. NIBLO, a citizen of the United States, and resident of Kansas City, in the county of Jackson and State of Missouri, have invented certain new and useful Improvements in Brake Mechanism, of which the following is a specification.

Our invention relates to improvements in brake-mechanisms, and one object is to provide a device of this character in which the brake shoes when set will engage practically the entire periphery of the brake drum or wheel and thus prove efficient in retarding or checking the rotary motion of said drum or wheel.

A further object is to provide means for adjusting the brake-shoes into proper relation with the drum, so that the wear will be uniformly distributed over the friction surfaces, and also dragging of the shoes on the drum is overcome.

A further object is to arrange and connect the various parts in such manner that they can be readily assembled for use or taken apart for repairs or replacements.

Other objects will hereinafter appear, and in order that the invention may be fully understood, reference will now be made to the accompanying drawing, in which:

Figure 1 is a side elevation partly broken away of our brake mechanism applied to the brake drum of an automobile.

Fig. 2 is a plan view of the parts disclosed by Fig. 1.

Fig. 3 is a fragmentary, horizontal section on line III—III of Fig. 1.

Fig. 4 is a fragmentary vertical section on line IV—IV of Fig. 1.

Fig. 5 is a detail elevation of a yoke employed in carrying out the invention.

Fig. 6 is a fragmentary side elevation of one end of an arm which supports the brake-shoes.

A designates the brake drum or wheel of an automobile. B designates a dust guard, one of which is mounted at each end of the housing C, inclosing the rear axle E. All of the foregoing parts are of usual construction, except that the dust guard B is reinforced with a cross arm 1, which supports the brake mechanism.

3 and 4 designate a pair of brake shoes disposed at opposite sides of the drum A and provided on their inner surfaces with linings 5 and 6, respectively, which can be readily replaced when worn out. The brake shoes 3 and 4 are provided intermediate their ends with lugs 8 and 9 having horizontal slots 11 and 12 for the reception of studs 14 and 15 upon which said brake shoes 3 and 4, respectively, may be adjusted toward or away from the drum A.

The studs 14 and 15 are adjustably mounted in vertical slots 17 and 19, respectively, in the ends of the arm 1. Said studs 17 and 19 are adjusted vertically through the intermediacy of set screws 21 and 22 extending through the slotted ends of the arm 1 and provided with lock nuts 24 and 25, whereby they are secured from accidental movement after adjusting the studs 14 and 15, respectively, up or down. The studs 14 and 15 are provided with shoulders 27 and 29 and nuts 31 and 32, respectively, whereby they are firmly secured to the ends of the arm 1 after being adjusted vertically. Washers 33 coact with the shoulders 27 and 29, in holding the brake shoes upon the studs.

The brake shoes 3 and 4 are provided at their ends with integral sleeves 34 and 35, respectively, through which parallel connecting-pins 37 loosely extend. Said connecting pins 37 also extend through the ends of a yoke 39 disposed adjacent to the shoe 3. Nuts 41 threaded on the connecting pins 37 and bearing against opposite sides of the yoke 39 firmly secure the same upon the pins 37 which are provided at their opposite ends with lock nuts 43 bearing against the adjacent ends of the sleeves 35. Coil springs 45 embrace the pins 37 and are interposed between the adjacent ends of the sleeves 34 and 35 to force and yieldably hold the shoes 3 and 4 out of engagement with the drum A.

The yoke 39 is provided intermediate its ends with a recess 47 to receive the brake shoe lug 8, which normally bears against the inner wall of said recess and thus coacts with the pins 27 and the nuts 43 in limiting the expansive action of the springs 45.

49 designates a cam mounted upon a pivot 50 extending through a pair of ears 52 on the intermediate portion of the yoke 39. Said cam 49 extends through a slot 54 in the yoke 39 and bears against the face of the lug 8 for a purpose which will hereinafter appear. The cam 49 is provided with an integral lever 56 to which a rod 58 is connected, which may be actuated by any suitable means.

In practice, the brake shoes 3 and 4 are adjusted into concentric relation with the drum or wheel A by proper vertical adjustment of the studs 14 and 15 in the slots 17 and 19 and adjustment of said shoes horizontally upon the studs 14 and 15, respectively. The studs 14 and 15 are thus firmly secured in place by tightening the set screws 21 and 22 and the nuts 31 and 32, respectively. Normally the shoes 3 and 4 are held in the off position disclosed by Fig. 1, through the intermediacy of the springs 45, but when it is desired to apply the brake to the drum A the shoes are caused to engage said drum by pulling upon the rod 58 in the direction of the arrow $a$. This action rotates the cam 49, causing its high radius 48 to roll against the lug 8 and force the shoe 3 firmly against the drum A. Said cam 49 also forces the yoke 39 in an opposite direction from the shoe 3 and causes said yoke 39, through the intermediacy of the pins 37 and the nuts 43, to pull the shoe 4 firmly into engagement with the drum A, the pressure of the shoes 3 and 4 upon the drum depending upon the degree of power applied to the rod 58. When it is desired to release the shoes 3 and 4 from the drum, the rod 58 is permitted to move backwardly whereupon the springs 45 force the shoes 3 and 4 apart and restore the yoke 39 and the cam 49 to their normal position, as disclosed on Fig. 1.

If any part of the mechanism should break or wear out it can be readily replaced as the parts can be quickly disassembled by removing the connecting pins 37 and the washers 33.

While we have shown our brake mechanism applied to the drum of an automobile we do not restrict ourselves to this specific use, but reserve the right to use said mechanism on all drums or brake-wheels to which it may be applied.

From the foregoing description it is apparent that we have produced a brake mechanism embodying the advantages above enumerated, and while we have shown and described the preferred form of our invention, we reserve the right to make such changes in the construction, combination, arrangement and proportion of parts, as properly fall within the spirit and scope of the claims.

Having thus described our invention, what we claim and desire to secure by Letters Patent, is:

1. In combination with a wheel, shoes arranged to engage said wheel, studs extending through horizontal slots in the shoes, an arm having vertical slots in which said studs are adjustably mounted, means for securing said studs at any point of their adjustment, a member disposed adjacent one of said shoes, elements connecting said member and the shoe most remote therefrom, the adjacent shoe being slidable upon said elements, and means to force said member and the adjacent shoe in opposite directions to cause the shoes to engage the wheel.

2. In combination with a wheel, shoes arranged to engage said wheel, means to adjust said shoes vertically and independently of the wheel, a support for the shoe adjusting means, a member disposed adjacent one of said shoes, elements connecting said member and the shoe most remote therefrom, the adjacent shoe being slidable upon said elements, and means to force said member and the adjacent shoe in opposite directions to cause the shoes to engage the wheel.

3. In combination with a wheel, shoes arranged to engage said wheel, springs interposed between said shoes to yieldably hold the same out of engagement with the wheel, means to adjust said shoes vertically and independently of the wheel, a support for the shoe adjusting means, a member disposed adjacent one of said shoes, elements connecting said member and the shoe most remote therefrom, the adjacent shoe being slidable upon said elements, and means to force said member and the adjacent shoe in opposite directions to cause the shoes to engage the wheel.

4. In combination with a wheel, shoes arranged to engage said wheel, means to adjust said shoes vertically and independently of the wheel, a support for the shoe adjusting means, a member disposed adjacent one of said shoes, a yoke disposed adjacent one of said shoes, parallel pins connecting said yoke and the shoe most remote therefrom, the adjacent shoe being slidable on said pins; and a cam to force the yoke and the adjacent shoe away from each other to cause the shoes to engage the wheel.

In testimony whereof we affix our signatures, in the presence of two witnesses.

LOUIS MASCHEK.
JAMES A. NIBLO.

Witnesses:
F. G. FISCHER,
L. J. FISCHER.